United States Patent
Flynn et al.

(10) Patent No.: US 6,499,652 B1
(45) Date of Patent: *Dec. 31, 2002

(54) ENVELOPE ASSEMBLY HAVING FOLD LINES

(76) Inventors: Timothy J. Flynn, 18 Caloosa Rd., Key largo, FL (US) 33037; Patrick J. Flynn, 107 Jennifer St., Redlands, CA (US) 92373; Kenneth A. Kritz, 7203 Inverway, Crystal Lake, IL (US) 60014

( * ) Notice: Subject to any disclaimer, the term of this patent is extended or adjusted under 35 U.S.C. 154(b) by 0 days.

This patent is subject to a terminal disclaimer.

(21) Appl. No.: 09/549,628

(22) Filed: Apr. 14, 2000

Related U.S. Application Data

(63) Continuation-in-part of application No. 09/412,466, filed on Oct. 5, 1999, and application No. 09/416,152, filed on Oct. 11, 1999, which is a continuation-in-part of application No. 09/412,466, filed on Oct. 5, 1999, and application No. 09/415,802, filed on Oct. 11, 1999, which is a continuation-in-part of application No. 09/412,466, filed on Oct. 5, 1999.

(51) Int. Cl.⁷ .............................................. B65D 27/04
(52) U.S. Cl. ...................... 229/71; 229/68.1; 229/75; 206/308.1
(58) Field of Search .................... 229/71, 75, 68.1; 206/308.1

(56) References Cited

U.S. PATENT DOCUMENTS

| | | |
|---|---|---|
| 1,259,322 A | 3/1918 | Vawter |
| 1,273,960 A | 7/1918 | Wagemaker |
| 1,336,270 A | 4/1920 | Zimmerman |
| 1,460,761 A | 7/1923 | McPike et al. |
| 1,743,191 A | 1/1930 | Charlton |
| 1,757,122 A | 5/1930 | Hunter |
| 1,922,213 A | 8/1933 | Middleton |
| 2,345,793 A | 4/1944 | Chapel |
| 2,986,325 A | 5/1961 | Loderhose |
| 3,061,172 A | 10/1962 | Loderhose |
| 3,371,850 A | 3/1968 | Gorman |
| 3,774,839 A | 11/1973 | Woods |
| 4,035,218 A | 7/1977 | Yount |
| 4,110,502 A | 8/1978 | Baer |
| 4,334,618 A | 6/1982 | Buescher |
| 4,492,308 A | 1/1985 | Meeker et al. |
| 4,708,285 A | 11/1987 | Segall |
| 4,809,905 A | 3/1989 | Goodman |
| 4,863,537 A | 9/1989 | Sadri |
| 4,868,027 A | 9/1989 | Hunkeler et al. |
| 4,923,111 A | 5/1990 | Down |
| 5,050,792 A | 9/1991 | Segall |
| 5,052,613 A | 10/1991 | Lin |
| 5,071,167 A | 12/1991 | O'Brien |
| 5,101,973 A | 4/1992 | Martinez |
| 5,209,353 A | 5/1993 | Lehtovaara |
| 5,262,216 A | 11/1993 | Popat et al. |
| 5,296,279 A | 3/1994 | Birnbaum et al. |
| 5,316,344 A | 5/1994 | Popat et al. |
| 5,333,780 A | 8/1994 | Scott |
| 5,340,427 A | 8/1994 | Cusack et al. |
| 5,348,216 A | 9/1994 | Scott |

(List continued on next page.)

FOREIGN PATENT DOCUMENTS

EP      0 693 442 A2      1/1996

*Primary Examiner*—Jes F. Pascua
(74) *Attorney, Agent, or Firm*—Pauley Petersen Kinne & Erickson

(57) ABSTRACT

A versatile envelope assembly that can be printed upon either before or after the resulting envelope is assembled. The resulting envelope can be used to store a wide variety of items, including compact discs and digital video discs, and can also provide a label for labeling the items contained in the envelope. The label is specially designed to extend the life of compact discs and digital video discs when applied to these items. Furthermore, the resulting envelope can be used as a mailing envelope, a filing pocket, a ring-binder pocket, or for any other suitable use.

25 Claims, 14 Drawing Sheets

U.S. PATENT DOCUMENTS

| | | |
|---|---|---|
| 5,579,908 A | 12/1996 | Johnson |
| 5,587,214 A | 12/1996 | Mitchell, Jr. |
| 5,738,748 A | 4/1998 | Mitchell, Jr. |
| 5,752,652 A | 5/1998 | Castro |
| 5,770,289 A | 6/1998 | Tracy |
| 6,220,504 B1 * | 4/2001 | Flynn et al. .............. 229/75 X |
| 6,220,505 B1 * | 4/2001 | Flynn et al. .................. 229/75 |
| 6,279,817 B1 * | 8/2001 | Flynn et al. .................. 229/75 |

* cited by examiner

ENVELOPE ASSEMBLY HAVING FOLD LINES

CROSS REFERENCE TO RELATED APPLICATIONS

This application is a continuation-in-part of: (1) Ser. No. 09/412,466, filed on Oct. 5, 1999; (2) Ser. No. 09/416,152, filed on Oct. 11, 1999, which is a continuation-in-part patent application of Ser. No. 09/412,466, filed on Oct. 5, 1999; and (3) Ser. No. 09/415,802, filed on Oct. 11, 1999, which is a continuation-in-part patent application of Ser. No. 09/412,466, filed on Oct. 5, 1999.

BACKGROUND OF THE INVENTION

1. Field of the Invention

This invention is directed to an envelope, or an envelope assembly, having a removable panel with an adhesive coating on one side such that the removable panel can be separated from the envelope, or the envelope assembly, and adhered to another surface. The invention is also directed to an envelope, or envelope assembly, having a tab, and/or offset tearable lines, and/or nested rings, and/or a removable partial circle, and/or registration lines, and/or fold lines, and/or an index tab label, and/or ring binder holes, and/or a partial protective panel, and/or a non-adhesive removable panel label, and/or a printable protective panel. The envelope, or the envelope assembly, can be fed through a printer, such as a laser printer, an ink jet printer, an impact printer, a thermal transfer printer, a direct thermal printer, a typewriter, or any other suitable graphic printing device.

2. Description of Related Art

Envelopes can be used to hold a wide variety of items, including letters, documents, compact discs, DVDs, pictures, baseball cards, and the like. Quite often, it is desirable to have a label for adhering to items within an envelope. In order to label items and store them in envelopes, one must purchase the envelopes and the labels separately. Furthermore, an outside surface of the envelope usually must be labeled to indicate what the contents are inside the envelope.

An envelope having a window is one way to reveal the contents of an envelope, but labels must still be purchased separately in order to label the contents themselves. If the labels and the envelopes are separate items, they cannot be run through a printer simultaneously.

In addition, labels affixed to objects, such as compact discs (CDs), with adhesive can harm the discs if a user attempts to remove the labels. More specifically, damage may be caused by pulling off some of the disc protective coating, metal and dye along with the label. A somewhat contradictory reason to oppose the use of labels with adhesives on CDs is that some adhesives can dry out and become less effective over time, especially in the presence of heat, thus the labels could arguably become unattached while being used in a CD drive. Furthermore, ink printed on a thin label is subject to bleeding through the label and onto the CD, which could easily damage the protective coating on the read/write portion of the CD. However, discs with no labels at all are subject to scratching of the protective coating, metal and dye, which can cause irreversible damage.

A further setback in envelope organization is difficulty in distinguishing one envelope from another. When envelopes are aligned in a row, they typically all look alike. Even when a surface of an envelope is labeled, one must usually sort through a number of envelopes, looking at an entire surface of each one, before finding the sought-after envelope.

Envelope assemblies produced as a continuous web during the manufacturing process can be difficult to produce due to the precision required in separating adjacent assemblies from one another. If a cutting device used to separate adjacent assemblies from one another is even slightly misaligned, a large number of misshapen, nonfunctional assemblies can result from the misalignment.

When assembling an envelope from an envelope assembly, a protective panel is often difficult to separate from a face sheet. Not only does this difficulty lead to frustration, but it can also result in worn edges of the face sheet. Furthermore, once the protective panel is separated from the face sheet, it is often difficult to evenly fold one element of the assembly onto another element of the assembly, thereby resulting in a lopsided, uneven envelope.

Accordingly, a need exists for a new and improved envelope, or envelope assembly, that provides means for labeling the envelope and any contents within the envelope. A need also exists for an envelope that can be more easily identified and organized. A further need exists for an envelope assembly that can be easily manufactured and assembled to form an envelope having a finished appearance.

SUMMARY OF THE INVENTION

The present invention relates to an envelope, or an envelope assembly, with a removable panel that can be printed upon simultaneously while printing upon the envelope or envelope assembly. The envelope, or envelope assembly, can further comprise a tab for ease of identification and organization.

The envelope assembly includes a sheet of material having a printable surface on one side and an adhesive covered by a protective panel on another side. The sheet of material comprises an assembly shape preferably having a primary panel adjacent a secondary panel. At least one flap is preferably but not necessarily located along at least one edge of the primary panel and/or the secondary panel.

In one preferred embodiment, the sheet of material is rectangular with perforated, micro-perforated and/or die-cut lines located around at least a portion of a periphery of the assembly shape, thereby separating the assembly shape from a remainder portion of the material.

The protective panel is preferably transparent or translucent, and may also be printable. The adhesive coating at least partially covers one side of a removable panel located on the assembly shape and/or on the remainder portion. Alternatively, instead of adhesive coating, the removable panel can be statically adhered to the protective panel. When the removable panel is removed from a remainder of the envelope or envelope assembly, the transparent or translucent protective panel enables a user to view any contents of the envelope from outside the envelope.

In one preferred embodiment, the primary panel, the secondary panel and/or the remainder portion of the material is preferably die-cut to form the removable panel. The removable panel can be in a shape of a compact disc label, for example, so that graphics can be printed upon the printable surface of the primary panel and/or the secondary panel, and the removable panel can then be separated from the primary panel and/or the secondary panel and adhered to a compact disc. Alternatively, the removable panel can be in a shape of a DVD label suited to fit a non-read/write portion of the DVD. Furthermore, multiple nested ring-shaped removable panels can be located on the primary panel and/or the secondary panel, thereby providing multiple ring-shaped labels for multiple purposes.

The adhesive coating also at least partially covers one side of the at least one flap, and/or at least one edge of the primary panel and/or at least one edge of the secondary panel. The protective panel can be removed to expose the adhesive coating. In one preferred embodiment of this invention, the adhesive coating entirely covers one side of the sheet of material. In another preferred embodiment of this invention, the adhesive coating only partially covers the one side of the sheet of material. In yet another preferred embodiment of this invention, the adhesive coating entirely covers one side of the sheet of material, and a second sheet of material is attached to the sheet of material and contains a portion of the assembly shape thereon. In a further embodiment of this invention, a laminate layer is coated with an adhesive coating on both sides and is located between the sheet of material and the protective panel.

The protective panel preferably has at least one tearable line of separation, such that a portion of the protective panel can be separated from a remaining portion, such as a border portion, of the protective panel. In one preferred embodiment, the tearable lines of separation are located along fold lines of the flaps. In another preferred embodiment, the tearable lines of separation are offset from the tearable lines of separation on the sheet of material for ease in separating the protective panel from the sheet of material in the appropriate places.

To form an envelope, the protective panel is first partially or completely separated from the adhesive to expose the adhesive on each flap, edge of the primary panel and/or edge of the secondary panel. The flaps and/or the secondary panel are then folded toward the primary panel such that surfaces with exposed adhesive are aligned to contact surfaces to which they can adhere, thereby forming an envelope.

In one preferred embodiment, at least one tab extends outward from the primary panel and/or the secondary panel. A flap can be die-cut about a portion of a periphery of the tab, such that the tab remains extending outward while the flap can be folded over and adhered to either the primary panel or the secondary panel. The tab can be printed upon directly, or alternatively, the removable panel can be of a size and shape suitable to be adhered to the tab.

The envelope assembly of the present invention can be designed and constructed in a wide range of sizes for a number of different uses. In particular, the envelope assembly is suitable for housing compact discs, mini-discs, baseball cards, photographs, and many other items. Furthermore, the envelope and/or envelope assembly can have one or more holes in the primary panel corresponding with one or more holes in the secondary panel, thereby enabling a user to store the envelope in a ring-binder, such as in a personal planner.

When the envelope assemblies are produced along a continuous web, registration lines can extend between adjacent assemblies, thereby providing for a margin of error in the process of separating adjacent assemblies. Furthermore, fold lines can be created on the envelope assemblies in order to make the assembly process of the envelope more user-friendly. Such fold lines can be created by score lines, perforations and/or micro-perforations and can be located between flaps, panels and any other component intended to be folded.

When the envelope assembly has a circular removable panel situated on either the primary panel or the secondary panel, one of the flaps can have a removable partial circle situated on the flap in such a manner that when the flap is folded, no portion of the flap blocks the view of the circular removable panel. This embodiment is desirable whether or not the flap on which the removable partial circle is located is or is not intended to be used to close the envelope. When the flap is not intended to close and seal the envelope, the flap on which the removable partial circle is located can be tucked inside the envelope, thereby providing reinforcement at the opening of the envelope and, if the protective panel is transparent and/or translucent, the flap will not impede the view of the contents of the envelope. When the flap is intended to close and seal the envelope, if the protective panel is transparent and/or translucent, once again, the flap will not impede the view of the contents of the envelope.

It is therefore an object of the present invention to provide an envelope, or an envelope assembly, that has at least one, or multiple, nested, ring-shaped removable panels suitable to be adhered to a compact disc (CD) or digital video disc (DVD).

It is a further object of the present invention to provide an envelope, or an envelope assembly, with a removable panel suitable in size and shape to be adhered to an index tab.

It is another object of the present invention to provide an envelope assembly having offset tearable lines for ease of removal of the protective panel from the sheet of material.

It is yet another object of the present invention to provide an envelope assembly having a partially circular removable panel on one of the flaps.

It is also another object of the present invention to provide an envelope assembly having registration lines extending between adjacent assemblies for improved results during the manufacturing process.

It is still another object of the present invention to provide an envelope assembly having fold lines along edges of portions intended to be folded in order to create an envelope.

It is likewise another object of the present invention to provide an envelope assembly that can be manufactured quickly and inexpensively using a first sheet of material covered on one side by an adhesive with a protective panel covering the adhesive, and a second sheet of material attached to the first sheet of material.

It is moreover another object of the present invention to provide an envelope and/or an envelope assembly having ring binder holes for convenient storage.

It is yet another object of the present invention to provide an envelope and/or envelope assembly having a removable panel label suitable for labeling CDs and DVDs that does not adversely affect CDs and DVDs.

It is finally another object of the present invention to provide an envelope assembly having a printable protective panel. In this embodiment, the protective panel is also preferably transparent and/or translucent such that the contents of the envelope can still be seen through the protective panel once a removable panel is removed.

The foregoing and other features and advantages of the present invention will become further apparent from the following detailed description of the presently preferred embodiments, read in conjunction with the accompanying drawings. The detailed description and drawings are intended to illustrate the present invention rather than limit the scope of the present invention as defined by the appended claims and equivalents of the appended claims.

BRIEF DESCRIPTION OF THE DRAWINGS

The present invention can be better understood with reference to the following drawings. In the drawings, like reference numerals designate corresponding parts throughout the several views. Moreover, it should be noted that the drawings are not necessarily to scale, emphasis instead being placed upon clearly illustrating principles of the present invention.

DETAILED DESCRIPTION OF PREFERRED EMBODIMENTS

Figure 1:
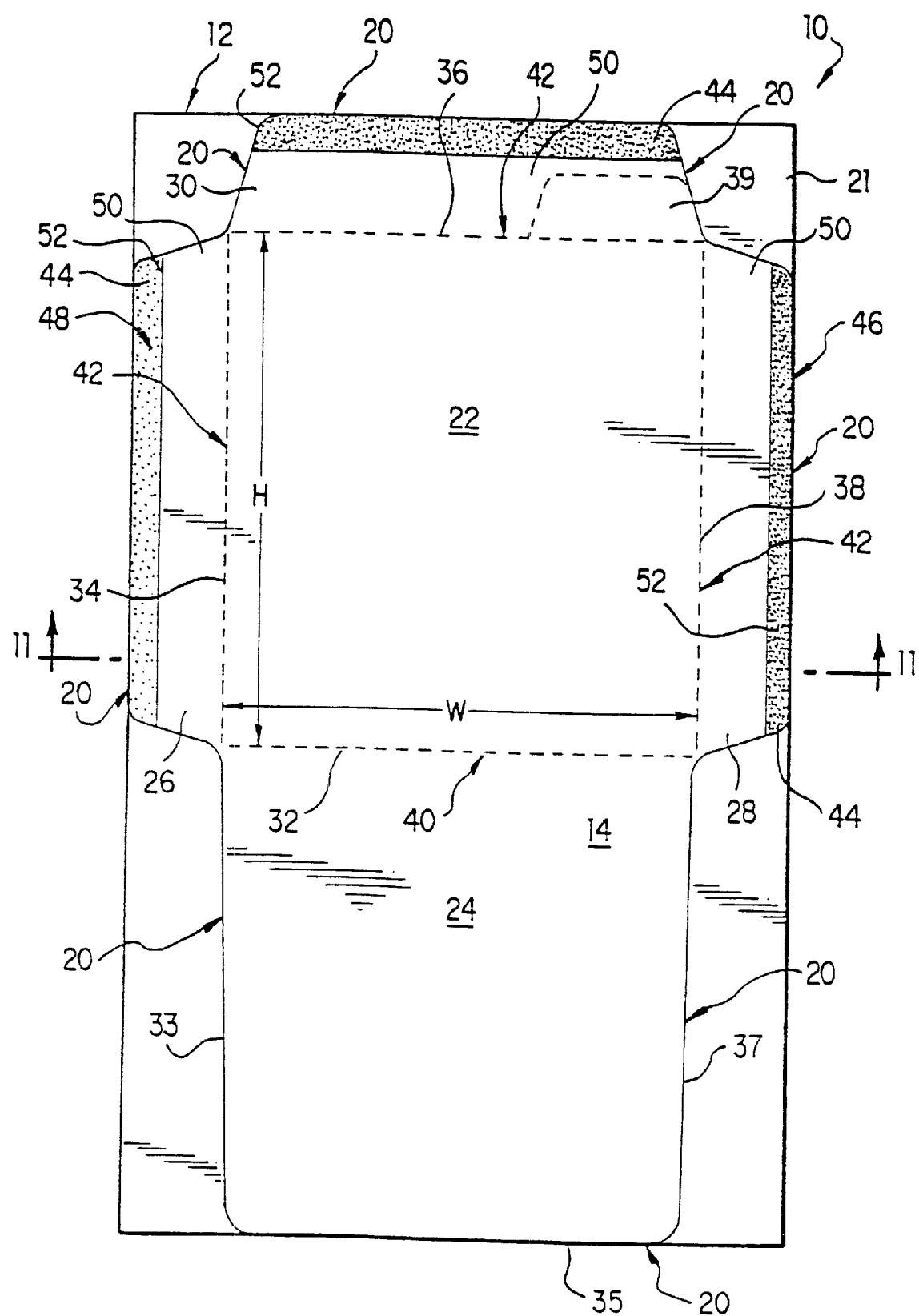
FIG. 1 illustrates a front plan view of a first preferred embodiment of an envelope assembly in sheet form and an unfolded position, showing three areas, each where a protective panel is removed, thereby exposing a layer of adhesive coating.
Figure 2:
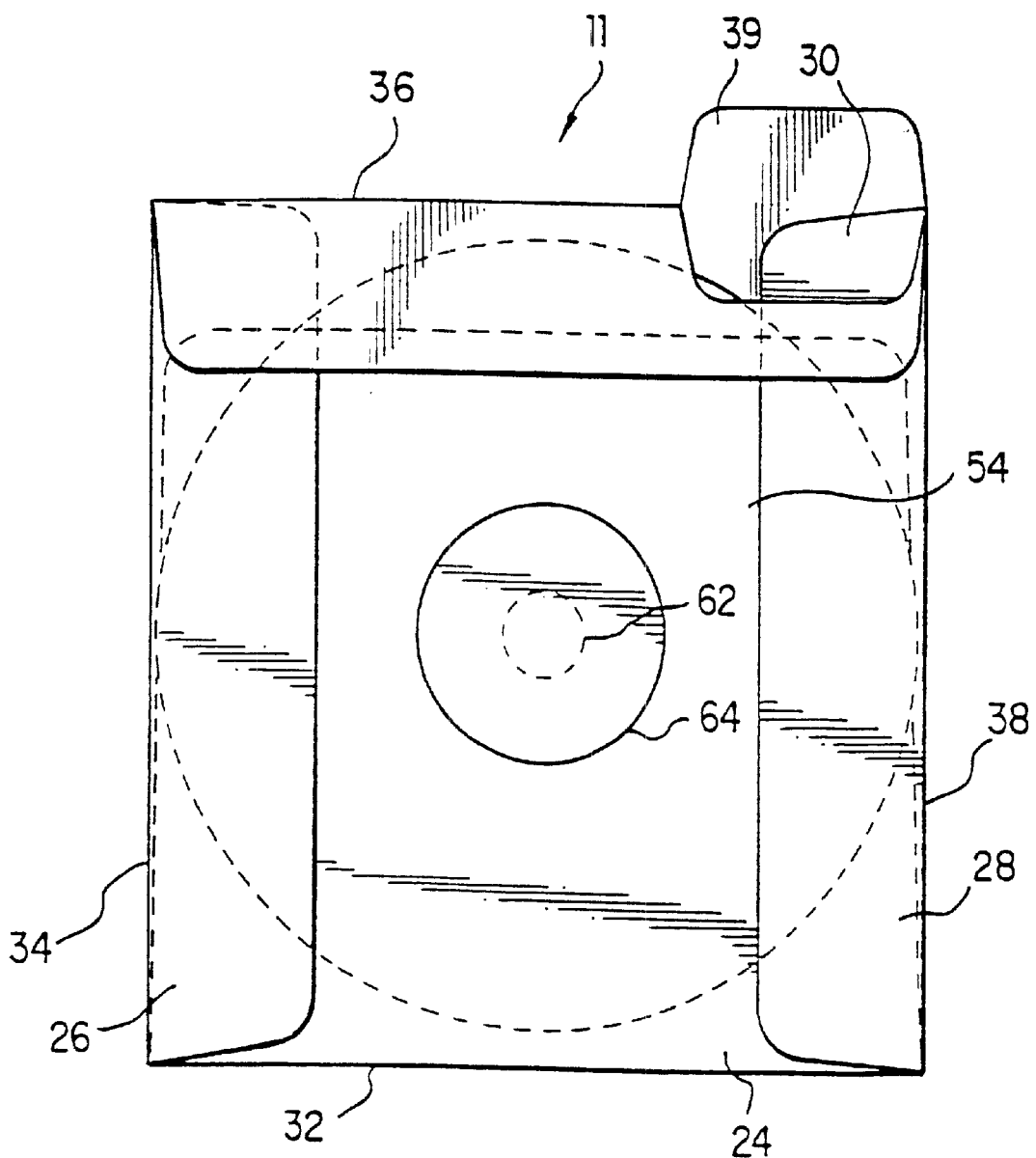
FIG. 2 illustrates a front plan view of the envelope assembly shown in FIG. 1, but in a folded position with a compact disc inserted within a pocket formed by the folded envelope assembly.
Figure 3:
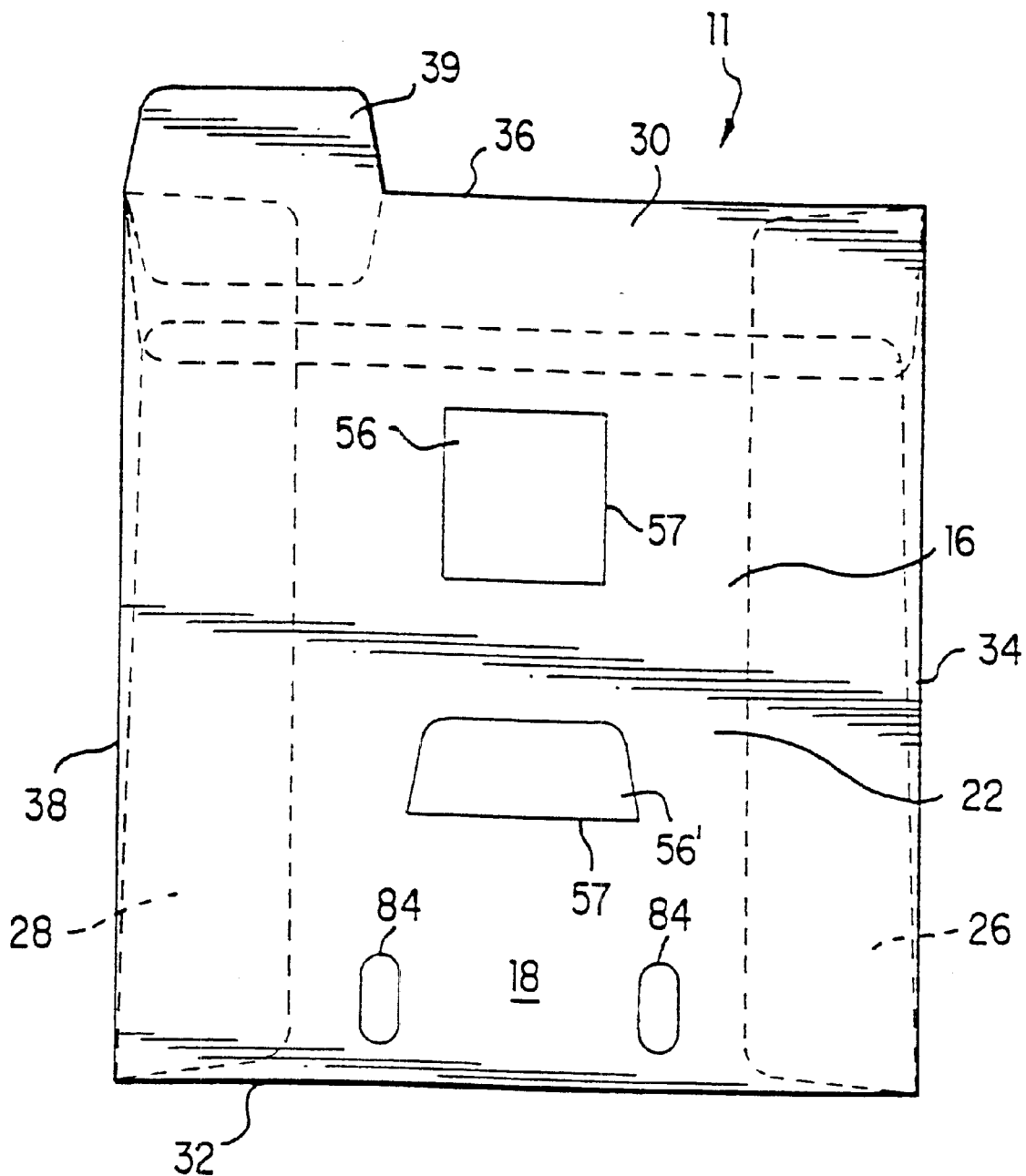
FIG. 3 illustrates a rear plan view of the envelope assembly shown in FIGS. 1 and 2, in a folded position.
Figure 4:
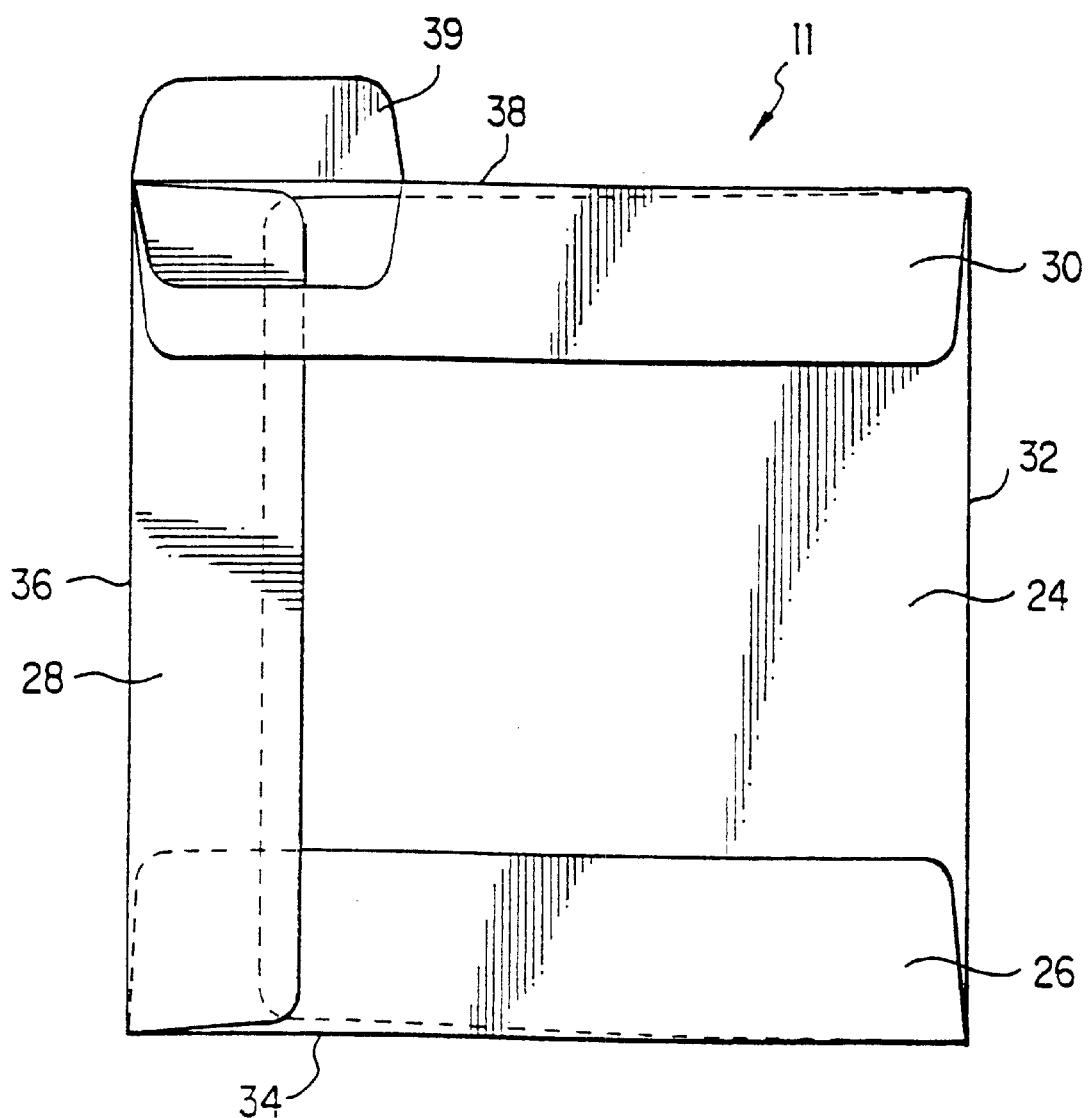
FIG. 4 illustrates a front plan view of a second preferred embodiment of the envelope assembly in a folded position.

FIGS. 1, 2 and 3 illustrate a first preferred embodiment of an envelope assembly 10 in accordance with the present invention. As generally shown in FIG. 1, an envelope assembly 10 comprises a sheet 12 of material that can be fed into and run through a printer. An assembly shape 20, which may also be referred to as a tearable shape, can then be separated from a remaining portion 21 of the sheet 12 and folded into an envelope 11 for holding, for example, a compact disc 54 (CD), as shown in FIG. 2. A removable panel 56 and 56', as shown in FIG. 3, can be separated from the sheet 12 as a label and adhered to a separate surface. Regardless of whether the envelope 11 comprises the removable panel 56, the envelope 11 can comprise a tab 39 for organizational purposes.

Referring still generally to FIG. 1, the sheet 12 is of any suitable shape, and generally any suitable size that can be accepted by and fed through a printer, such as a laser printer or an ink jet printer. Common sizes of paper generally fed through printers are 8.5 inches by 5.5 inches, 8.5 inches by 11 inches, 8.263 inches by 11.688 inches (A4 size), and 8.5 inches by 14 inches. The sheet 12 is preferably but not necessarily constructed of any suitable paper, paper composite, non-metal and/or metal material that can be used as a label. Other suitable materials for constructing the sheet 12 include fabric, plastic, and metal foils. An adhesive coating 44 covered by a protective panel 50 is applied, in any suitable manner known to those skilled in the art, to a first side 14 of the sheet 12. The sheet 12 preferably has a printable surface 16 on a second side 18, as shown in FIG. 3. The printable surface 16 can be any of a variety of face materials used to make pressure sensitive, or self-adhesive labels. Such face materials may include, but are not limited to: smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Furthermore, various portions of the face materials can be different colors, thereby resulting in different colored parts, such as the removable panel 56 and/or the tab 39.

As used throughout this specification and in the claims, the term printable surface relates to a surface of any type of matter upon which a person or machine can draw, print, color, paint, photocopy, write, emboss, or make any other type of mark or graphic. Laser printers, ink jet printers, impact printers, thermal transfer printers, direct thermal printers, typewriters, or any other suitable graphic printing devices are preferred but not necessary for use with printable surfaces according to this invention.

Still referring generally to FIG. 1, within the sheet 12 is an assembly shape 20 comprising a primary panel 22, a secondary panel 24 and at least one, preferably two, more preferably three flaps 26, 28 and 30. As used throughout this specification and in the claims, the phrase assembly shape, or the phrase tearable shape, is intended to relate to a shape, such as the shape identified in FIG. 1 by element reference numerals 20, that can be torn away from a remaining portion 21 of the sheet 12, by using tearable lines, such as die-cut lines, perforated lines, micro-perforated lines, or any combination of these types of separation, or any other suitable structure that enables separation. A preferred type of tearable line is a line that is die-cut and also has perforations. The assembly shape 20 can be die-cut along at least a portion of a periphery, defined by perforations, and/or defined by micro-perforations, such that the assembly shape 20 can be easily removed or separated from a remaining portion 21 of the sheet 12, for example after the sheet 12 is run through a printer.

In one preferred embodiment, the primary panel 22 can be square or rectangular, thereby having four edges 32, 34, 36 and 38. In one preferred embodiment, the primary panel 22 has a width (W) in a range between about 4.75 inches and about 5.25 inches, and a height (H) in a range between about 4.75 inches and about 5.25 inches. In other embodiments, the primary panel 22 can have any suitable circular, polygonal or non-polygonal shape. The secondary panel 24 is located along the edge 32 of the primary panel 22. A primary fold line 40, which may or may not be marked, or formed, with score lines, perforations and/or micro-perforations, is located at the edge 32 where the primary panel 22 and the secondary panel 24 meet. Instead of marking, or forming, the primary fold line 40 with the types of incisions or perforations mentioned in this specification, the primary fold line 40 can alternatively be marked, or formed, with grooves, impressions, or any other type of modification of the assembly 10 that facilitates easy folding. Each of the flaps 26, 28 and 30 are located at separate edges 34, 36 and 38 of the primary panel 22. Alternatively, at least one of the flaps 26, 28 and 30 can be located at a corresponding edge 33, 35 or 37 of the secondary panel 24. Secondary fold lines 42, possibly marked with score lines, perforations and/or micro-perforations, are located at the edges 34, 36 and 38 of the primary panel 22 where each of the flaps 26, 28 and 30 and the primary panel 22 meet, and possibly at a junction between the secondary panel 24 and any of the flaps 26, 28 and 30.

In one preferred embodiment, the envelope assembly 10 comprises three flaps 26, 28 and 30, one located along each edge 34, 36 and 38 of the primary panel 22 not occupied by the secondary panel 24, as shown in FIGS. 1–4, 7 and 10. Flap 30 can be partially coated with a suitable adhesive to form an adhesive coating 44 for securely sealing the envelope assembly 10. Alternatively, no adhesive coating 44 is applied to the flap 30, or the flap 30 comprises a resealable type of closure, as known by those skilled in the art, such that the envelope assembly 10 can be sealed and opened multiple times without tearing or otherwise distorting the sheet 12. In a further alternative embodiment, illustrated in FIGS. 8 and 9, the flap 30 is located along one of the edges 33, 35 and 37 of the secondary panel 24. When flaps 26 and 28 are located on opposite edges 34 and 38 of the primary panel 22 and the edge 36 remains flapless, the assembly shape 20 without any remaining portion 21 of the material can easily be fed through a printer, with the edge 36 being fed first.

When manufacturing the envelope assembly 10, the sheet 12 of material can originate from a long, continuous web of material later to be cut into separate sheets 12 each having an envelope assembly 10. For example, the envelope assembly 10 in FIG. 12 can be separated from adjacent envelope assemblies 10 connected to the flap 30 and the secondary panel 24. In order to provide a clean cut between adjacent envelope assemblies 10, taking into account manufacturing registration needs or a margin of error in spacing the cut, registration lines 78 extend between adjacent envelope assemblies 10. The registration lines 78 are preferably but not necessarily substantially perpendicular to the resulting edge 35 of the secondary panel 24, of an upline envelope assembly 10, and the resulting edge 31 of flap 30, of a downline envelope assembly 10. Both edges 35 and 31 are co-extensive with edges of the resulting sheet 12. At the points from which the registration lines 78 extend from the assembly 10, the registration lines 78 can either meet at or near the side edges of the flap 30 and the secondary panel 24 at angles, such as right angles, or the registration lines 78 can be co-extensive with the side edges of the flap 30 and the secondary panel 24.

As shown in FIGS. 1–4 and 8, the tab 39 can be formed within or integrated as part of the flap 30. More specifically, the flap 30 is die-cut about a portion of a periphery of the tab 39. The tab 39 can then be separated from the flap 30 along the periphery of the tab 39, such that when the flap 30 is folded over, the tab 39 remains extended outward from the primary panel 22 and generally within a same plane as the primary panel 22. Any number of the tabs 39 can be formed within any of the flaps 26, 28 and 30, and/or within the primary panel 22 and/or the secondary panel 24.

Figure 5:
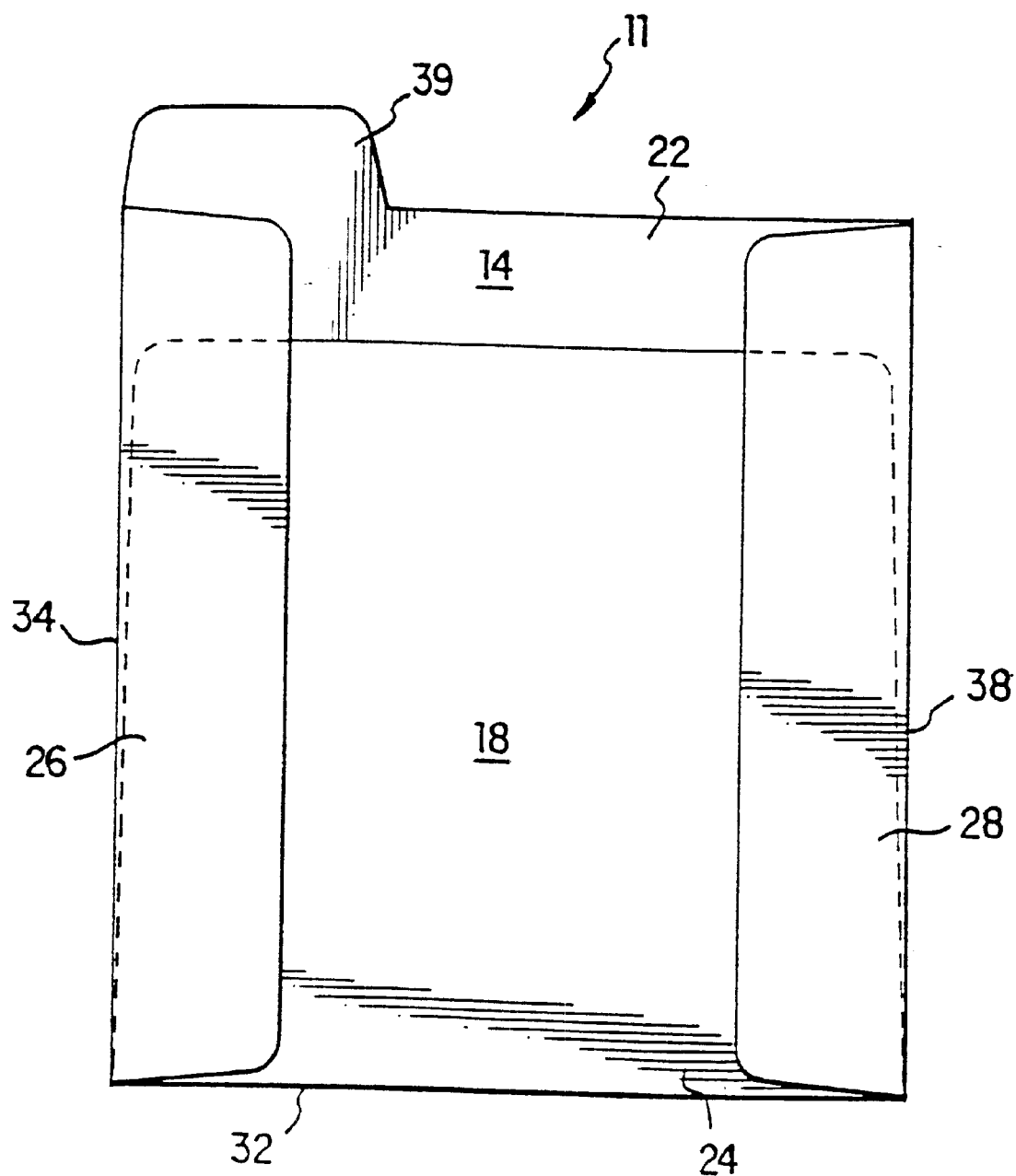
FIG. 5 illustrates a front plan view of a third preferred embodiment of the envelope assembly, having only two flaps, in a folded position.
Figure 6:
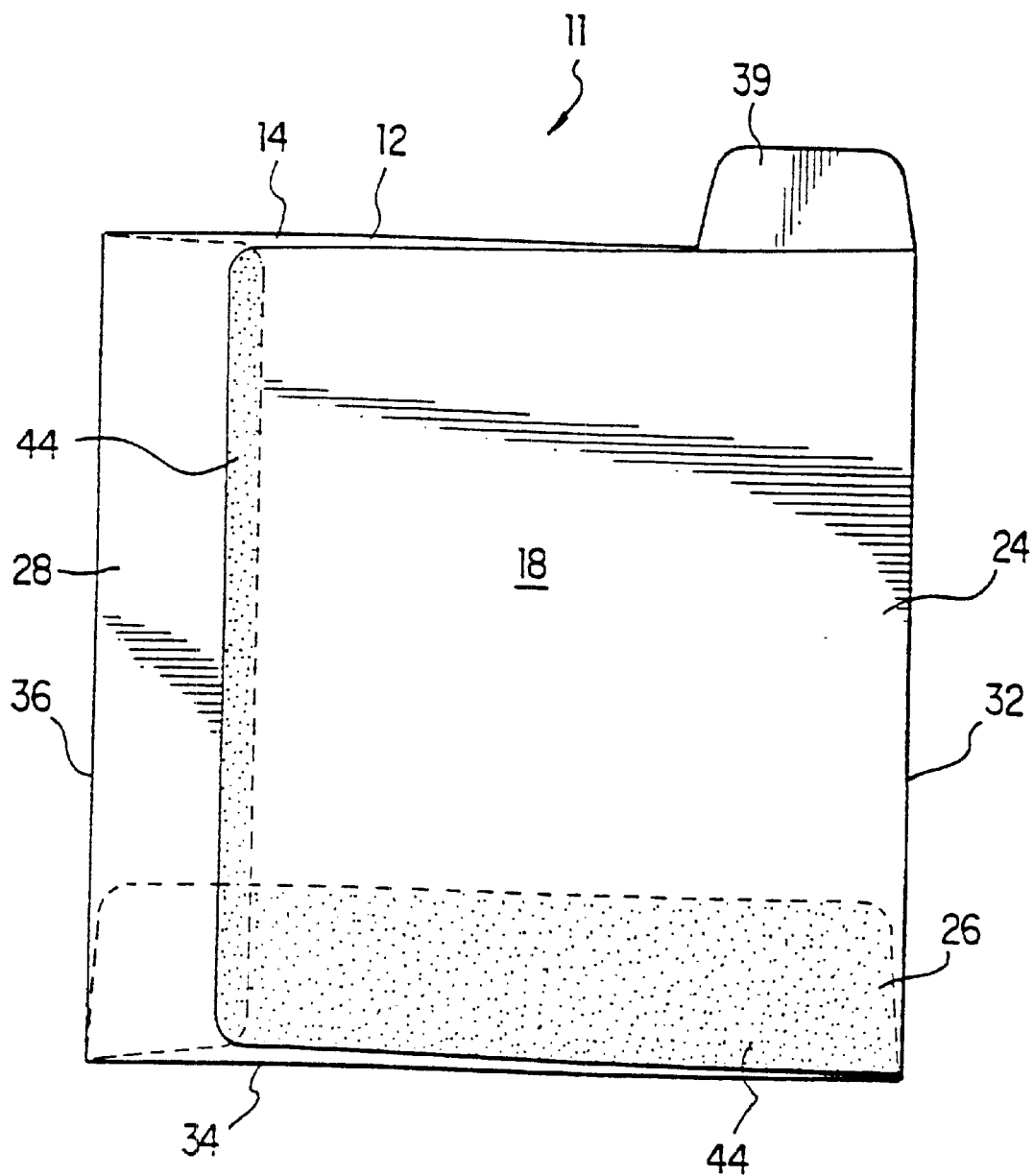
FIG. 6 illustrates a front plan view of a fourth preferred embodiment of the envelope assembly, in a folded position, having only two flaps, and having an adhesive coating only on a secondary panel.

In other embodiments having only two flaps 26 and 28, the flaps 26 and 28 can be located either on the two opposing edges 34 and 38 adjacent the edge 32 on which the secondary panel 24 is located, as shown in FIG. 5, or on the edge 36 opposite the secondary panel 24 and on the edge 34 adjacent the edge 32 on which the secondary panel 24 is located, as shown in FIG. 6. In a further embodiment, one flap 26 can be located on one of the edges 34, 36 and 38 of the primary panel 22 and the other flap 28 can be located on one of the edges 33, 35 and 37 of the secondary panel 24. It is apparent that any number of flaps can be located at any position which is suitable for adhering one or more of the flaps 26, 28 and/or 30 to the primary panel 22 and/or the secondary panel 24.

In an embodiment of the present invention having only two flaps 26 and 28, the tab 39 is formed within a periphery or integrated as a part of the assembly shape 20, such as shown in FIGS. 5 and 6. The tab 39 extends outward from the edge 36 of the primary panel 22 not occupied by either of the flaps 26 and 28. In other preferred embodiments of the present invention, more than one tab 39 can extend outward from the edge 36 of the primary panel 22. As in an embodiment having three flaps 26, 28 and 30, any additional tabs 39 can also be formed within or integrated as part of the flaps 26 and 28, and/or within the primary panel 22 and/or within the secondary panel 24. In a preferred embodiment, the tabs 39 are staggered cut in any suitable group number. For example, a first envelope can have a first tab 39 on a left portion adjacent the edge 36 of the primary panel 22, a second envelope can have a tab 39 on a middle portion of the edge 36 of the primary panel 22, and a third envelope can have a tab 39 on a right portion adjacent the edge 36 of the primary panel 22.

Figure 11:
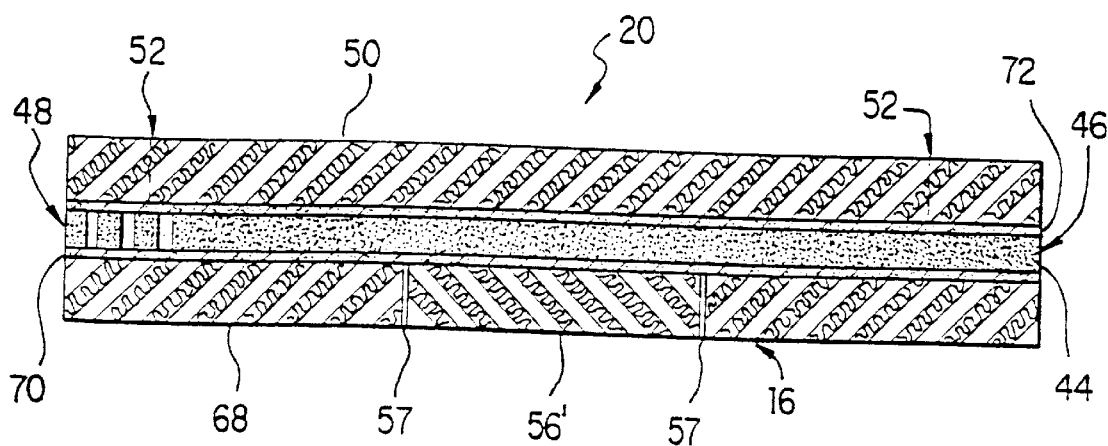
FIG. 11 illustrates a cross-section view, taken along line 11—11 as shown in FIG. 1, of the unfolded envelope assembly.

The adhesive coating 44 preferably adheres significantly more to the sheet 12 than to the protective panel 50, such that the protective panel 50 can be removed to expose the adhesive coating 44 which preferably remains on the sheet 12. In such a preferred embodiment, the adhesive coating 44 at least partially covers the first side 14 of each of the flaps 26, 28 and 30. The adhesive coating 44 can be applied in either a continuous format 46, as shown on flap 28 in FIGS. 1 and 11, or a patterned format 48, as shown on flap 26 in FIGS. 1 and 11. The adhesive coating 44 can cover the entire first side 14 of the assembly shape 20, in which case, to prevent undesired adhesion, a protective panel 50 preferably also covers the entire area covered by the adhesive coating 44.

The protective panel 50 preferably has at least one tearable line of separation 52, either die-cut or perforated with, for example, perforations and/or micro-perforations, located either along at least one of the edges 32, 34, 36 and 38 of the primary panel 22 or offset on at least one of the flaps 26, 28 and 30 a set distance from the primary panel 22. As shown in FIG. 1, the tearable line of separation 52 is located between an outer edge of the flap 26, 28 or 30 and the fold line 42 but it is apparent that the tearable line of separation 52 can coincide with the fold line 42. As shown by the dotted lines in FIG. 12, the tearable lines of separation 52 can be offset inside and/or outside of the assembly shape 20, thereby intersecting the perimeter of the assembly shape 20 at points 80 and 82, such that when the assembly shape 20 is removed or separated from the sheet 12, the protective panel 50 remains on the adhesive coating 44 and then can be easily removed from the adhesive coating 44 when desired. Thus, when the protective panel 50 is separated at the tearable line of separation 52, an area of adhesive coating 44 under the separated portion of the protective panel 50 is exposed.

Referring to FIGS. 1–10 and 12, to form the envelope assembly 10 into the envelope 11, at least one of the flaps 26, 28 and 30 and/or the secondary panel 24 without exposed adhesive coating 44 is folded over to face the first side 14 of the primary panel 22. The protective panel 50 is separated from the adhesive coating 44 and torn from any remaining portion of the protective panel 50, such as at the tearable lines of separation 52. The flaps 26, 28 and 30 and/or the secondary panel 24 with exposed adhesive coating 44 are preferably then folded over the first folded flaps 26, 28 and 30 and/or secondary panel 24, to construct the envelope 11. The folded flaps 26, 28 and 30 and/or secondary panel 24 are secured by contacting the exposed adhesive coating 44 with surface portions of the flaps 26, 28 and 30 and/or the secondary panel 24 without exposed adhesive coating 44.

In an alternative embodiment, the adhesive coating 44 can at least partially cover the first side 14 of the secondary panel 24, without covering any of the flaps 26 and 28, as shown in FIG. 6. In this embodiment, the flaps 26 and 28 are first folded inward, and the secondary panel 24 is subsequently folded over to face the flaps 26 and 28. Preferably then, the flaps 26 and 28 and the secondary panel 24 are secured in place with the adhesive coating 44.

Figure 13:
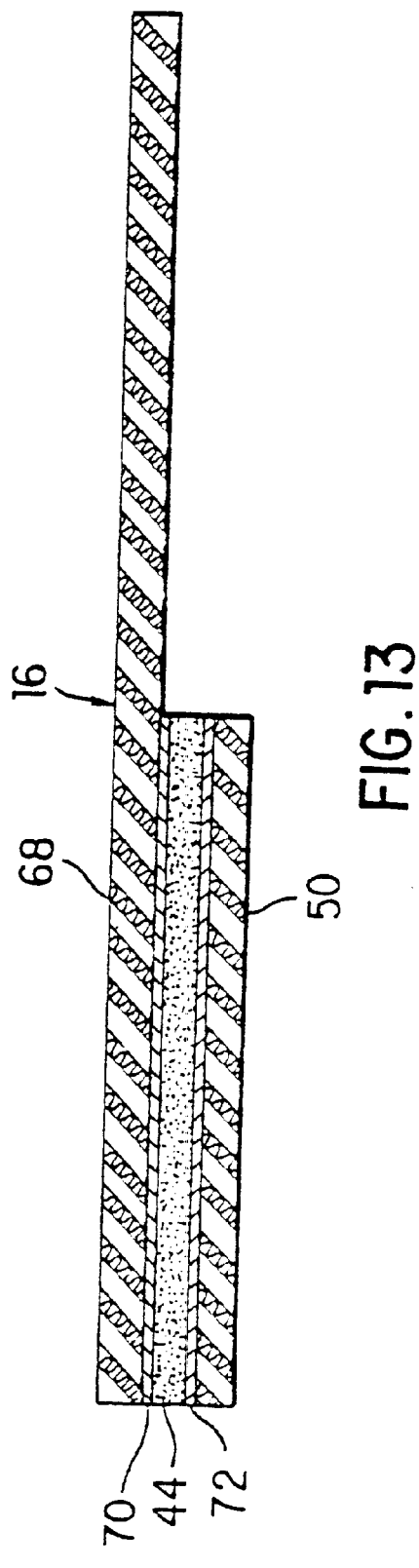
FIG. 13 illustrates a cross-section view, taken along line 13—13 as shown in FIG. 12, of the unfolded envelope assembly.

In another embodiment, shown in cross-section in FIG. 13, the adhesive coating 44 covers only approximately one-half of the sheet 12. This embodiment can be easily, and efficiently, manufactured due to the fact that the adhesive coating 44 and the protective panel 50 are applied to the sheet 12 in one area, rather than across the entire sheet 12 or in specific locations. Furthermore, this embodiment is cost-efficient in that only about one-half of the amount of protective panel 50 material and about one-half of the amount of adhesive coating 44 are required to manufacture this embodiment, compared to the embodiment in which an entire surface of the sheet 12 is coated and covered with the adhesive coating 44 and the protective panel 50.

Figure 14:
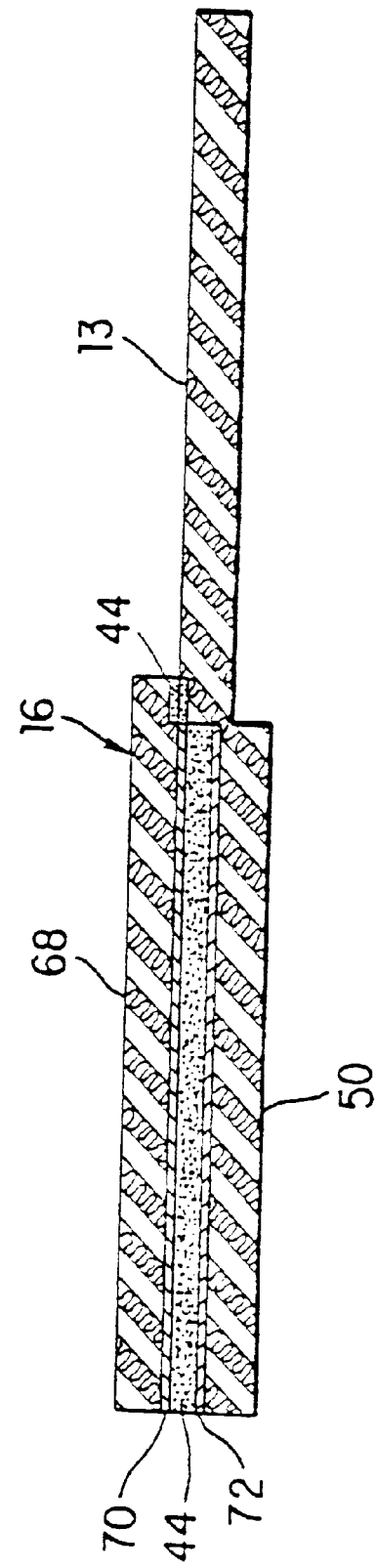
FIG. 14 illustrates a cross-section view of an alternative embodiment of the unfolded envelope assembly.

In still another embodiment, shown in cross-section in FIG. 14, a second sheet of material 13 is attached to the sheet 12. The second sheet 13 and the sheet 12 are about equal in size and together form a single sheet of any suitable shape and/or size, preferably a shape and/or size that can be accepted by and fed through a printer. In this embodiment, an entire surface of the sheet 12 is coated and covered with the adhesive coating 44 and the protective panel 50, but the amount of adhesive coating 44 and protective panel 50 material used is also equal to about one-half of the amount of protective panel 50 material and roughly half the amount of adhesive coating 44 required to manufacture the embodiment in which an entire surface of a full-size sheet 12 is coated and covered with the adhesive coating 44 and the protective panel 50.

Figure 8:
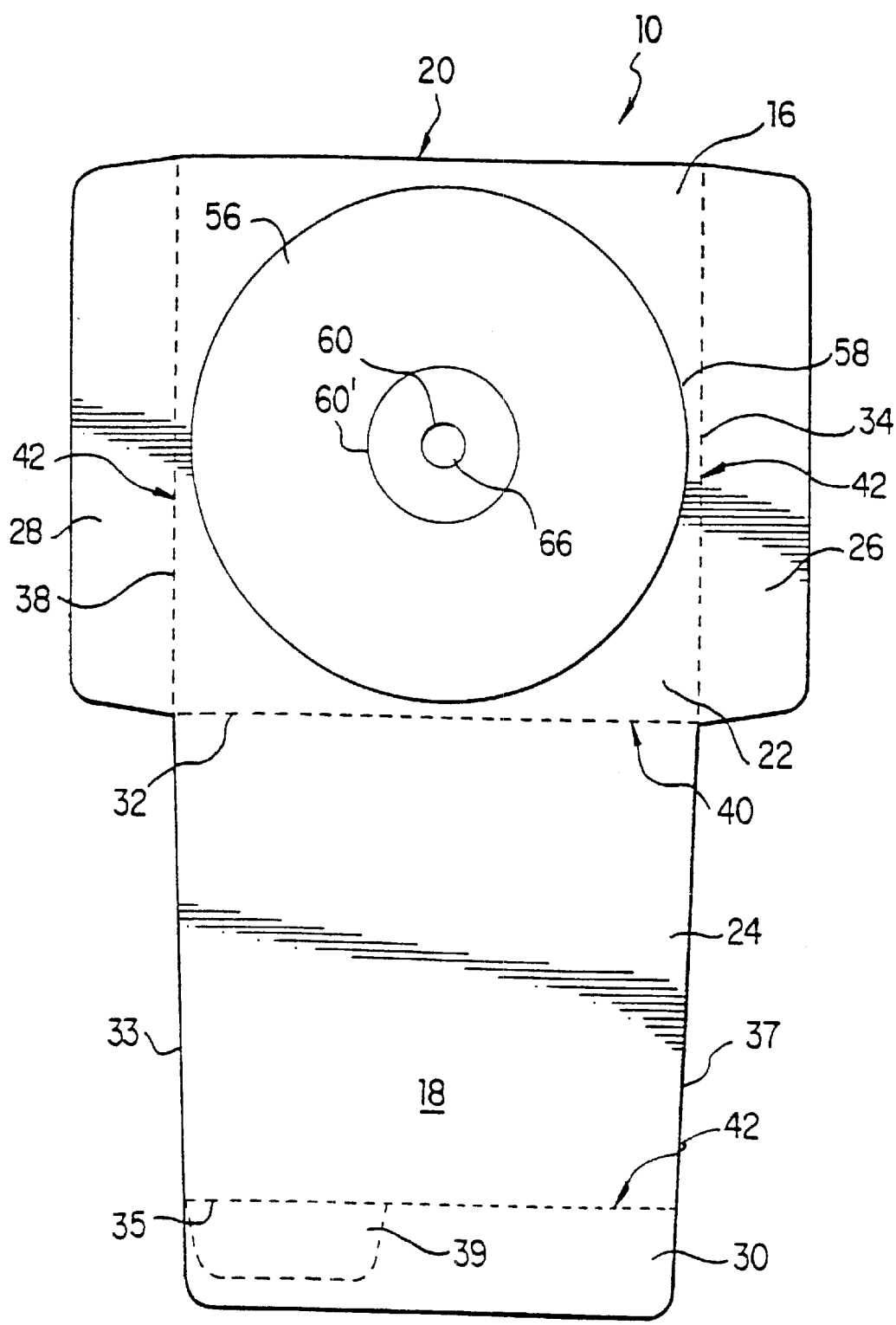
FIG. 8 illustrates a rear plan view of a sixth preferred embodiment of the envelope assembly in an unfolded position, showing a ring-shaped removable panel of a face material coated with an adhesive such that the removable panel can be separated from the assembly and, for example, adhered to a compact disc.
Figure 9:
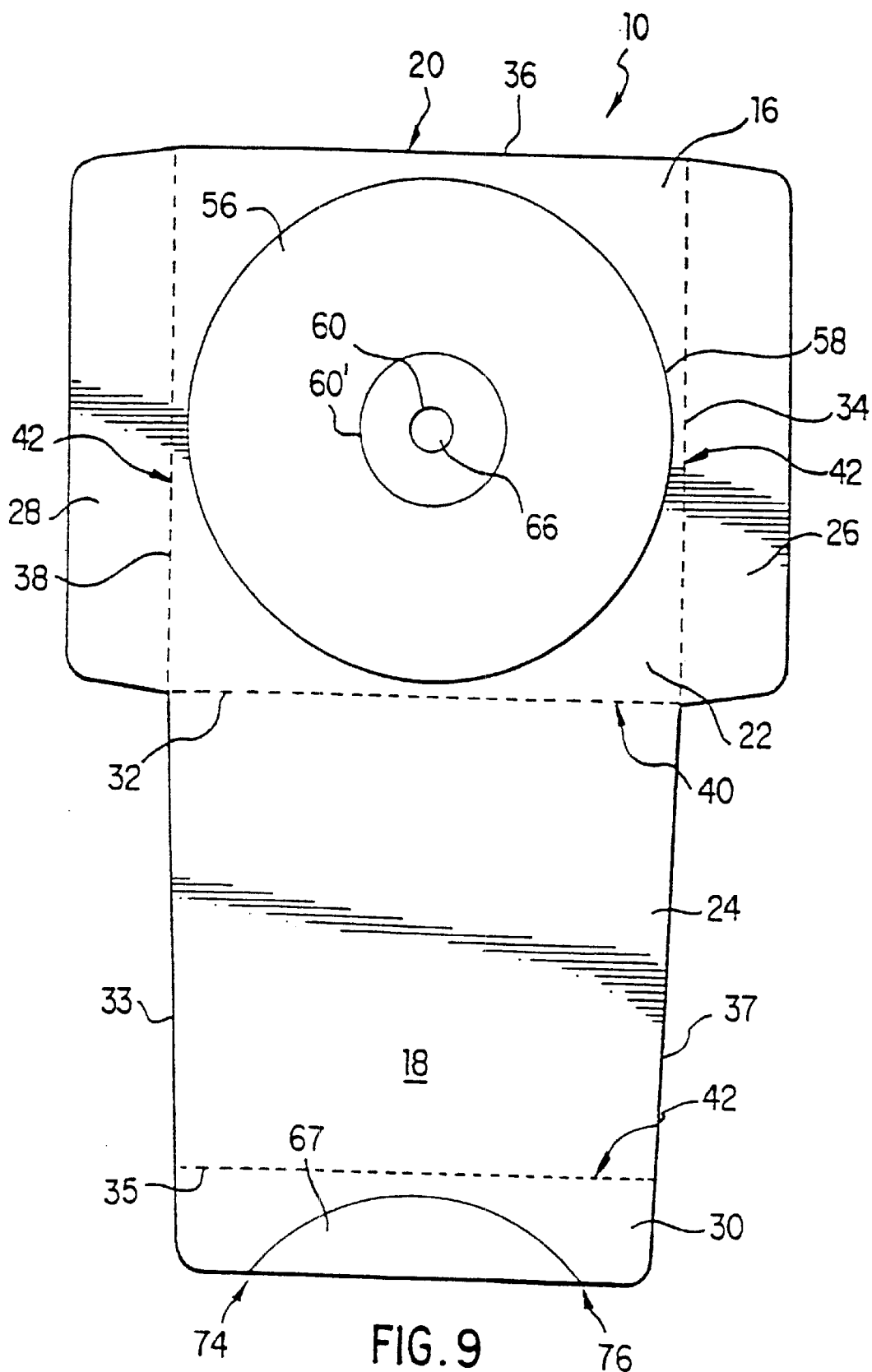
FIG. 9 illustrates a rear plan view of a seventh preferred embodiment of the envelope assembly in an unfolded position in an assembly shape having a removable panel.
Figure 10:
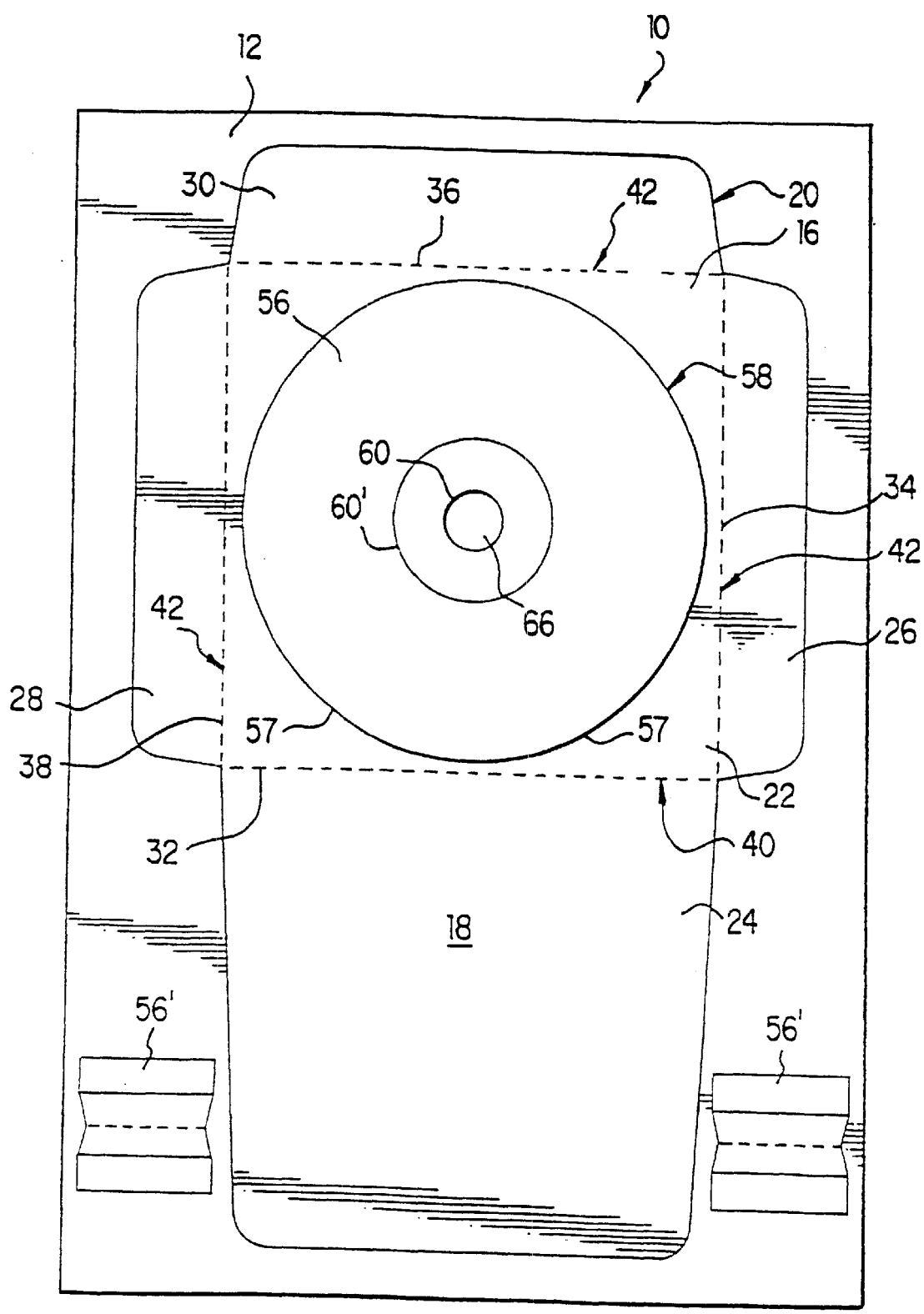
FIG. 10 illustrates a rear plan view of an eighth preferred embodiment of the envelope assembly in an unfolded position having removable panels in a remainder portion such that the removable panels can be used to form tabs.
Figure 12:
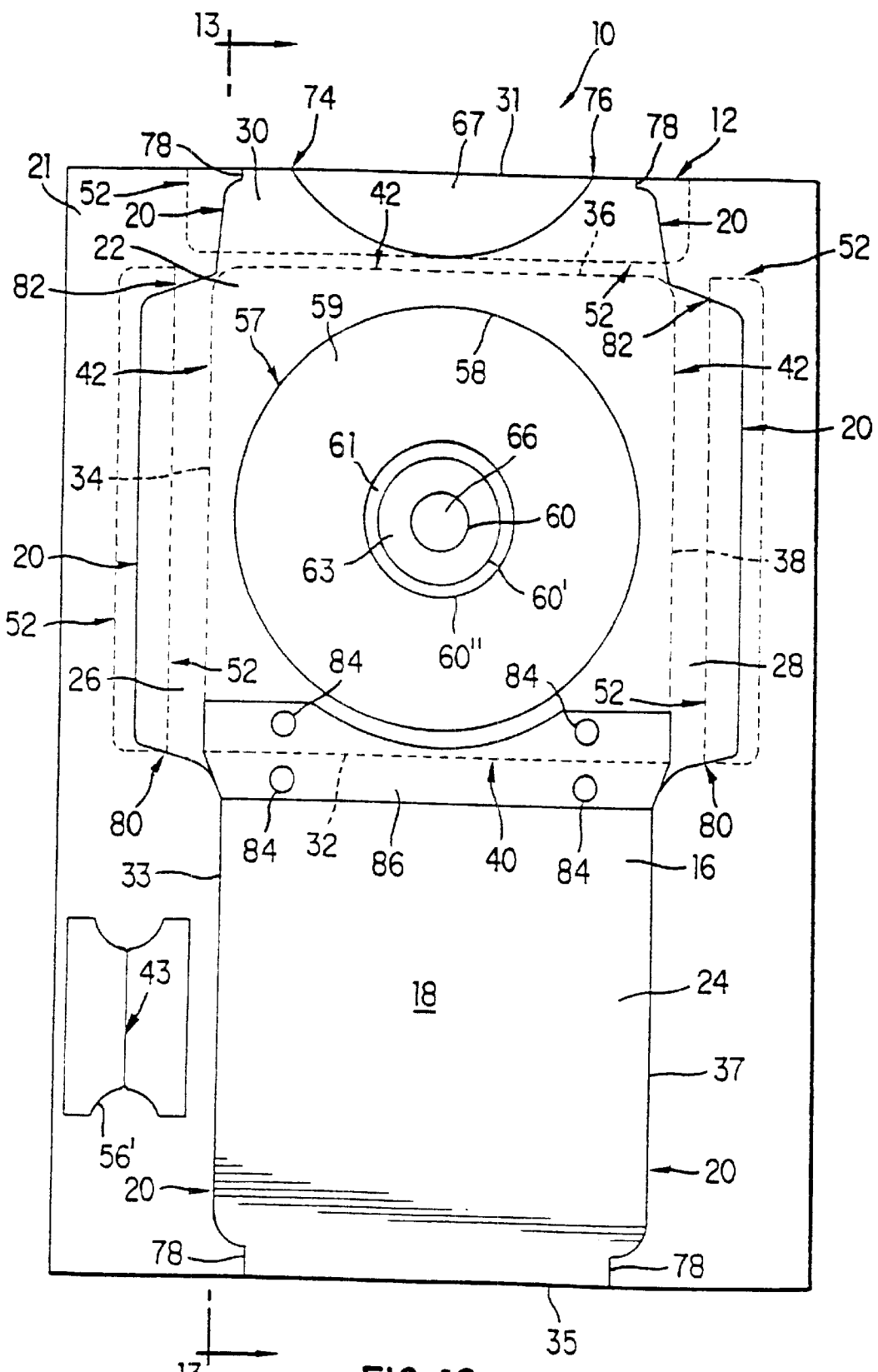
FIG. 12 illustrates a rear plan view of a ninth preferred embodiment of the envelope assembly in an unfolded position having offset tearable lines in the protective panel, nested ring-shaped removable panels in the face material, a removable partial circle on one of the flaps, and registration lines extending from the primary panel and the secondary panel.

In yet another embodiment, illustrated in FIGS. 3, 7, 8–10 and 12, the primary panel 22 and/or the secondary panel 24 comprises at least one removable panel 56 and/or 56', preferably with at least a portion of each removable panel 56 having the printable surface 16. The removable panel 56 can be a part of the printable surface 16 of the remaining portion 21 of the sheet 12. For example, as shown in FIGS. 10 and 12, the removable panel 56' can be a symmetrical shape that can be folded about a fold line 43 and adhered to an edge 32, 34, 36 or 38 of the primary panel 22, or an edge 33, 35 or 37 of the secondary panel 24. Removable panel 56' can be folded about an axis at fold line 43 and, for example, attached to an edge portion of envelope assembly 10 so that a portion of the removable panel 56' protrudes from the finished envelope 11 as an index tab label. The shape of the removable panel 56' when used as a free-standing index tab label is such that the removable panel 56' is symmetrical about the fold line 43 and shorter at the fold line 43 than at each of the edges which are parallel to the fold line 43. A removable panel 56' having such a shape provides a functional free-standing index tab that is less likely to get caught on or otherwise interfere with loose objects, as compared to an index tab wherein the fold line 43 is the same length as, or longer than, a base portion of the index tab.

In another embodiment, the removable panel 56' has a similar shape and a surface area less than or equal to a shape and a surface area of the tab 39, such that the removable panel 56' can be adhered to and completely or almost completely cover the tab 39. As shown in FIG. 3, for example, the removable panel 56' can have a shape and size similar to one side of the tab 39.

In one preferred embodiment of the invention, the primary panel 22, the secondary panel 24, and/or the remaining portion 21 of the sheet 12 is kiss-cut about at least a portion of a periphery of the removable panel 56 such that the removable panel 56 can be separated from the envelope 11 or the envelope assembly 10 while leaving intact the envelope 11 or the envelope assembly 10. The term "kiss-cut" refers to a separation by a knife cut through a face material layer 68, such as shown in FIGS. 11 and 13–15, without removing a matrix between the remaining layers.

Preferably the adhesive coating 44 covers one side of the removable panel 56. The removable panel 56 can be printed upon when the sheet 12 is run through a printer. After the removable panel 56 is printed upon, the removable panel 56 can be used as a label, or a sticker, to adhere to any suitable surface.

In an alternative embodiment, with no adhesive coating 44, the removable panel 56 can be constructed of a material which can be statically adhered to the protective panel 50. Once the removable panel 56 is removed from the protective panel 50, the removable panel 56 can be statically adhered to another surface, such as on a compact disc (CD) or a digital video disc (DVD). Suitable compositions for the sheet of material 12, or at least a portion of the sheet of material 12, where the non-adhesive, statically-adhering removable panel 56 is located, include vinyl polymers, such as Classics Plus® SELECT™ 81110SL Topcoated 8.0 Mil White Cling Vinyl, or any other suitable polymer. The non-adhesive, statically-adhering removable panel 56 preferably but not necessarily has a printable surface.

In one preferred embodiment of the present invention, the protective panel 50 at least covers an entire area of the first side 14 of the sheet 12 corresponding to the removable panel 56 on the second side 18 of the sheet 12. The protective panel 50 can be at least partially transparent or translucent, constructed of, for example, glassine or clear plastic, such that any contents of the envelope 11 can be viewed from outside the envelope 11 with the removable panel 56 removed. Yet a further embodiment of this invention includes a printable protective panel 50. With a printable surface, the protective panel 50 can be printed upon, particularly in the area covering the removable panel 56, such that when the removable panel 56 is removed from the protective panel 50, the text or graphics printed on the protective panel 50 are visible from outside the envelope 11. Materials suitable for use as the printable protective panel 50 include papers having a polymer layer and a gelatin coating, similar to a base coating that is conventionally used on paper for photographic film. The polymer layer is preferably a crosslinked polymer based on acrylic acid. Such materials are widely available, for example, from such manufacturers as Japan Paper & Pulp, and Hewlett-Packard, and/or under such trade names as EPSON®, KODAK®, FUJI®, and FASSON®. One particular example of a suitable material is GELITA® Imagel from Kind & Know Gelatine, Inc., in Sioux City, Iowa.

Figure 7:
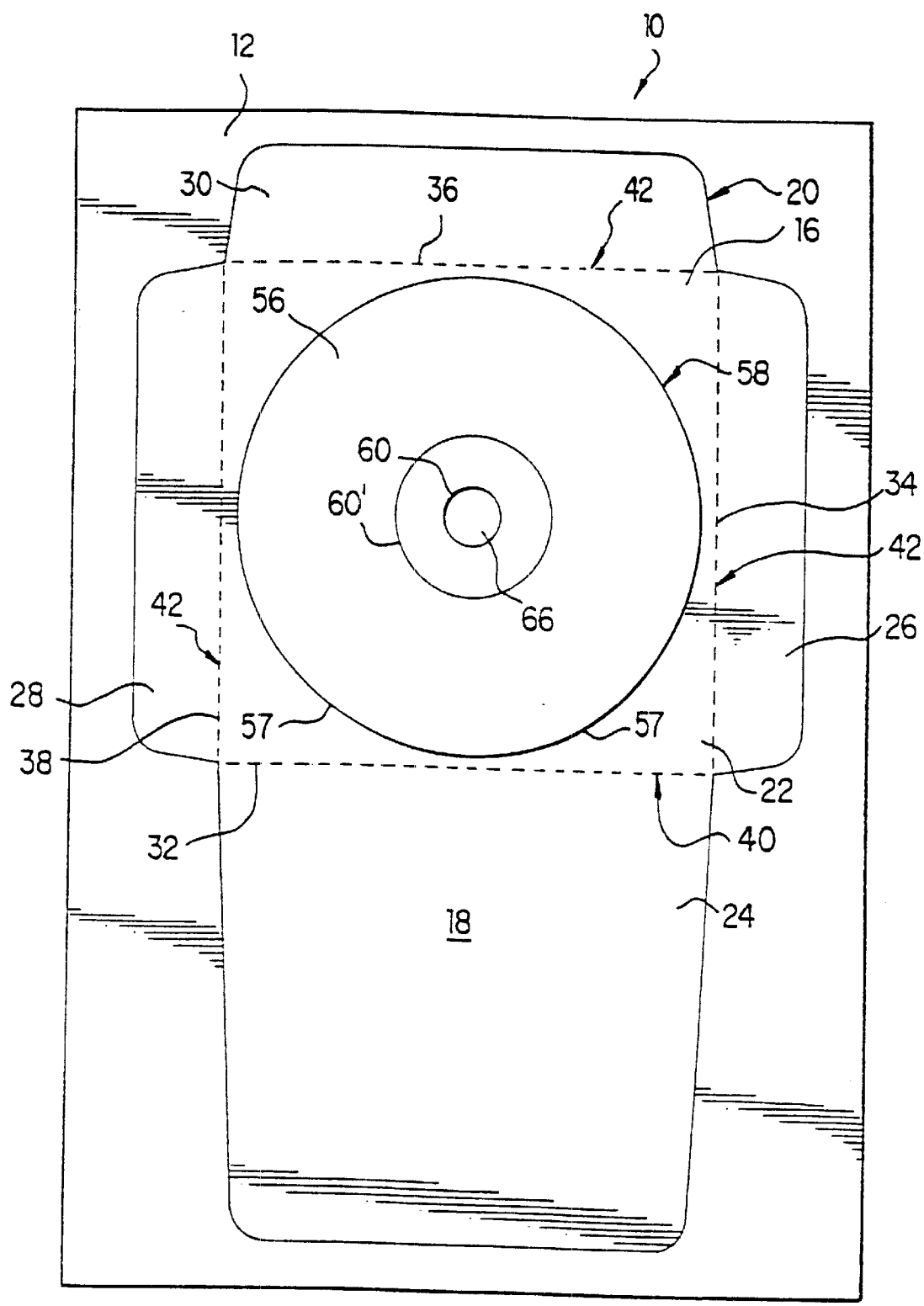
FIG. 7 illustrates a rear plan view of a fifth preferred embodiment of the envelope assembly in an unfolded position, having flaps but no tabs, and showing a ring-shaped removable panel of a face material coated with an adhesive such that the removable panel can be separated from the assembly and adhered to a compact disc.

In another embodiment, shown in FIG. 7, the removable panel 56 can be used as a label for the compact disc 54 shown in FIG. 2. More particularly, the second side 18 of the primary panel 22 and/or the secondary panel 24 is die-cut, perforated, micro-perforated, or otherwise cut to form tearable line of separation 57, as shown in FIG. 7, which can be used to remove the removable panel 56 in any suitable shape, such as a circle 58, preferably slightly smaller than a diameter of a compact disc 54. Tearable line of separation 57 can also be formed as a gap between the removable panel 56 and the primary panel 22 and/or the secondary panel 24.

A second, smaller shape such as a circle 60 or 60', approximately equivalent to either a diameter of an inner cut-out circle 62 of the compact disc 54, or a diameter of an inner circle 64 on the compact disc 54 where a read/write portion of the compact disc 54 adjoins a non-read/write portion of the compact disc 54, such as shown in FIG. 2, can be located within the circle 58. The removable panel 56 defined by the two circles 58 and 60 can be drawn upon, typed upon, or otherwise printed upon, such as when the sheet 12 is run through a printer, and can then be separated from the protective panel 50 to which the removable panel 56 initially adheres. The removable panel 56 can then be adhered to a non-read/write side of the compact disc 54.

A plurality of nested circular removable panels 59, 61, 63 can be located within the circle 58, as shown in FIG. 12. The ring-shaped removable panels 59, 61, 63 formed between circles 60, 60', 60", 58 can be used for a wide variety of purposes. For example, the ring-shaped removable panel 63 formed between circles 60 and 60' can be adhered to the small non-read/write portion of a DVD as a label. Similarly, the ring-shaped removable panel 59 formed between circles 60" and 58 can be adhered to the non-read/write portion of a CD as a label. Meanwhile, the ring-shaped removable panel 61 formed between circles 60' and 60" can serve as a spacer between the ring-shaped removable panel 59 and the ring-shaped removable panel 63 and can be discarded when the removable panel 59 and the removable panel 63 are removed from the protective panel 50. Removable panels 59, 61, 63 are preferably but not necessarily ring-shaped; removable panels 59, 61, 63 can also have any polygonal shape or any other suitable non-circular shape.

The protective panel 50 of these embodiments is preferably at least partially transparent or translucent, constructed of, for example, glassine or clear plastic, such that the compact disc 54 donning the removable panel 56 can be viewed from outside the envelope 11 through the transparent or translucent portion of the protective panel 50. The middle portion 66 of the label either can be printed upon during the printing process of the remainder of the printable surface 16 and used as a separate label or sticker, or the middle portion 66 can remain on the protective panel 50 after the removable panel 56 has been removed, or the middle portion 66 can simply be discarded.

Another embodiment, similar to the one shown in FIG. 7, is shown in FIG. 8. In this embodiment, the removable panel 56 is used as a compact disc label. However, like the embodiment shown in FIG. 9, the flap 30 in this embodiment is attached to the secondary panel 24 opposite the primary panel 22, rather than to the primary panel 22. Furthermore, the flap 30 is also die-cut about a portion of a periphery of a tab 39. As in the embodiments shown in FIGS. 7, 9 and 10, the removable panel 56 is bordered by the two circles 58 and 60 and can be printed upon when the sheet 12 is run through a printer, and can then be separated from the protective panel 50 to which the removable panel 56 initially adheres. The removable panel 56 can then be adhered to a non-read/write side of the compact disc 54. The protective panel 50 of this embodiment should also be at least partially transparent or translucent, constructed of, for example, glassine or clear plastic, such that the compact disc 54 donning the removable panel 56 can be viewed from outside the envelope 11 through the transparent or translucent protective panel 50.

In yet another embodiment, shown in FIGS. 9 and 12, a removable panel 67, such as in the shape of a partial circle or another suitable shape, which may or may not correspond to a portion of removable panel 56, is located on or adjacent the second side 18 of one of the flaps 30, such that the removable panel 67 intersects or is positioned near a perimeter of the flap at two points 74 and 76. The removable panel 67 preferably has a radius of curvature roughly equal to a radius of curvature of the circle 58. The removable panel 67 can be removed from either the sheet 12, or both the sheet 12 and the protective panel 50. When the resulting envelope 11 is intended to be sealed, for example for mailing purposes, the embodiment in FIG. 9 is appropriate, such that the flap 30 can be folded onto or adjacent the primary panel 22, and the removable panel 67 can be removed, thereby leaving the entire view of the area under the removable panel 56 unobstructed. When the resulting envelope 11 is not intended to be sealed, but instead is intended to remain open, for example for filing or storage purposes, the embodiment in FIG. 12 is appropriate, such that the flap 30 on which the removable panel 67 is located is folded into a pocket space formed by the envelope 11 once the removable panel 67 is removed, thereby providing reinforcement along the folded edge 36 without blocking the view of the contents in the envelope 11 from outside the envelope 11.

In another preferred embodiment of the present invention, the envelope assembly 10 is preferably laminated, as shown in FIGS. 11 and 13–15. The envelope assembly 10 preferably includes five layers in basic construction of a pressure sensitive label. The five layers include: (1) a face material 68; (2) a layer of a primer 70; (3) a layer of the adhesive coating 44; (4) a layer of the silicone coating 72; and (5) the protective panel 50. The face material 68 has a printable surface 16, as shown in FIGS. 3, 11 and 13–15. The primer 70 is a layer or coating applied to the face material 68 that improves a bond between the adhesive coating 44 and the face material 68. The primer 70 also acts as a barrier to migration of chemicals that could stain the face material 68. The adhesive coating 44 allows the face material 68 to be affixed to a surface, such as securing one part of the face material 68 to another part of the face material 68 in assembling the envelope 11. The silicone coating 72 at least partially covers at least one side of the protective panel 50 and allows for easy "release" of the protective panel 50 from the adhesive coating 44. During manufacture, the adhesive coating 44 laminates the face material 68 to the silicone coated protective panel 50.

Figure 15:
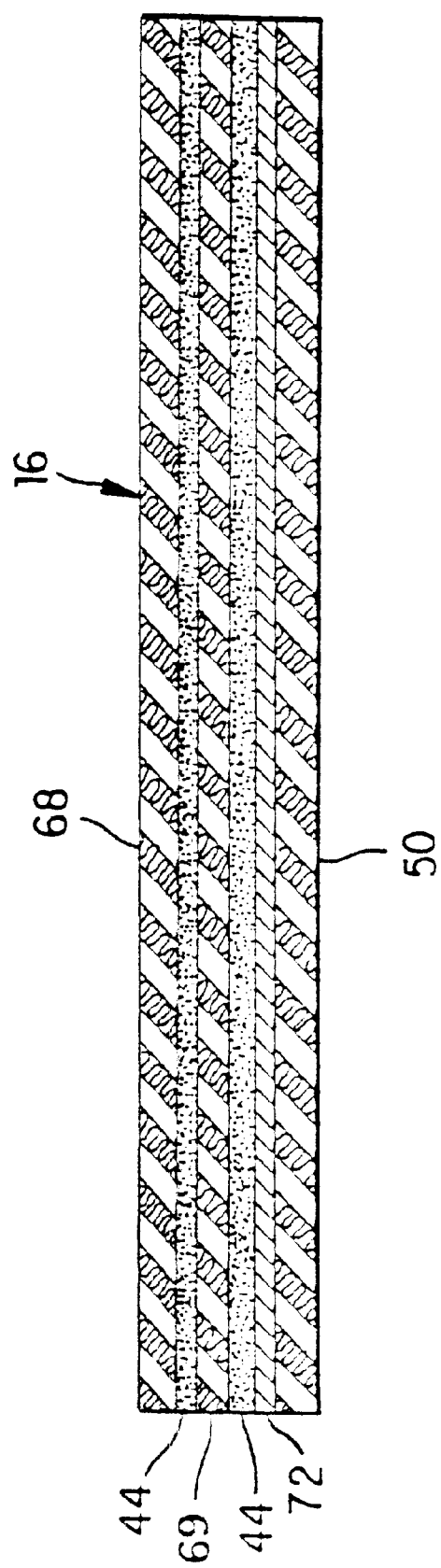
FIG. 15 illustrates a cross-section view of yet another alternative embodiment of the unfolded envelope assembly.

In an alternative embodiment of the present invention, shown in FIG. 15, the laminated envelope assembly 10 further comprises a laminate layer 69 between the face sheet 68 and the protective panel 50. The laminate layer 69 is positioned between two layers of the adhesive coating 44, with the face sheet 68 opposite one of the layers of the adhesive coating 44 and the protective panel 50 opposite the other layer of the adhesive coating 44. Additionally, a layer of the silicone coating 72 can be positioned between the protective panel 50 and one of the layers of the adhesive coating 44. Also, not shown in FIG. 15, layers of the primer 70 can be applied to the face material 68 and/or the laminate layer 69 in order to improve a bond between the adhesive coating 44 and the face material 68, and/or between the adhesive coating 44 and the laminate layer 69. The laminate layer 69 provides further protection from the threat of ink, for example from an ink jet printer, from bleeding into the adhesive coating 44 and further into a coating on a read/write portion of the compact disc 54 when the removable panel 56 is adhered to the compact disc 54, thereby protecting information stored on and extending the life of the compact disc 54. The laminate layer 69 can be constructed from any suitable polymer, including polyethylene, polyester, polypropylene, a liquid-applied extruded polymer, and/or any other suitable material.

In a preferred embodiment of the present invention, the protective panel 50 is of a size smaller than the sheet 12 and at least slightly larger than the removable panel 56. More particularly, in a preferred embodiment of the present invention geared toward housing the compact disc 54, the protective panel 50 is preferably about 5 inches by about 5 inches, or roughly the same size as the primary panel 22. The silicone coating 72 is applied in a layer to one side of the protective panel 50, such as in a manner known to those skilled in the art of labels. A layer of the adhesive coating 44 is then applied to and preferably covers the silicone coating 72. The protective panel 50 is then positioned over the second side 18 of the removable panel 56. When the removable panel 56 is separated from the envelope 11 or the envelope assembly 10, the adhesive coating 44 in contact with the removable panel 56 will release from the silicone coating 72 and will remain on the removable panel 56. The adhesive coating 44 in contact with an area surrounding the removable panel 56 on the second side 18 of the sheet 12 maintains the protective panel 50 in place with respect to the sheet 12 once the removable panel 56 has been removed.

The envelope assembly 10 of the present invention is suitable for a wide number of uses. Prior to folding and assembling, or even subsequent to folding and assembling, the envelope assembly 10 can be fed into and run through a printer for labeling and/or decorating any portion, including the tab 39 and the removable panel 56, or all of the resulting envelope 11. In its folded form, the envelope assembly 10 is a suitable size for holding compact discs 54. The envelope assembly 10 can be scaled up or down to house numerous other items, including stationery, photographs, and mini-discs. Additionally, holes 84 can be added to either the envelope assembly 10, as shown in FIG. 12, or to the finished envelope 11, as shown in FIG. 3. For example, the holes 84 enable a user to store the envelope 11 in a ring-binder, such as in a disc carrier or a personal planner. The holes 84 are preferably located in the primary panel 22 and/or the secondary panel 24, equidistant from the primary fold line 40, but may also be cut through any of the flaps 26, 28, 30, if necessary. The holes 84 can be circular or any other suitable shape. In one embodiment, circular holes 84 have a diameter in a range of between about 0.2 cm and 2 cm, preferably between about 0.3 cm and 1.5 cm, more preferably between about 0.4 cm and 1.2 cm. Additional reinforcement around the ring binder holes 84 can be provided with a support strip 86 or another suitable support backing, adhered to either the first side 14 or the second side 18, extending across part of the primary panel 22 and part of the secondary panel 24 and covering the area surrounding the holes 84, as shown in FIG. 12. Materials suitable for the support strip 86 include a MYLAR® material, a TYVEK® material, a TESLIN® material, a polypropylene material, a polyester material, a paper material, a synthetic paper material and a metal material.

While in the foregoing specification this invention has been described in relation to certain preferred embodiments thereof, and many details have been set forth for purpose of illustration, it will become apparent to those skilled in the art that the invention is susceptible to additional embodiments and that certain of the details described herein can be varied considerably without departing from the basic principles of the invention. Therefore, to particularly point out and distinctly claim the subject matter regarded as the invention, the following claims conclude the specification.

We claim:
1. An envelope assembly comprising:
   a sheet of material;
   a removable shape on a first surface of the sheet of material, defining a primary panel, a secondary panel, and at least two flaps located adjacent the primary panel near one of a plurality of edges of the primary panel;
   an adhesive coating at least partially covering a second surface of the sheet of material;
   a protective panel, comprising at least one of a transparent material and a translucent material, to which the adhesive coating adheres significantly less than to the sheet of material;
   at least one removable panel within the removable shape; and
   at least one fold line extending across the first surface of the sheet of material within a perimeter of the removable shape.
2. The envelope assembly of claim 1 wherein the at least one fold line separates the primary panel from the secondary panel.
3. The envelope assembly of claim 1 wherein the at least one fold line separates one of the flaps from the primary panel.
4. The envelope assembly of claim 1 wherein the at least one fold line is marked with score lines.
5. The envelope assembly of claim 1 wherein the at least one fold line is marked with perforations.
6. The envelope assembly of claim 1 wherein the at least one fold line is marked with micro-perforations.
7. The envelope assembly of claim 1 wherein the sheet of material comprises a printable surface.
8. The envelope assembly of claim 1 further comprising a layer of silicone positioned between the protective panel and the sheet of material.
9. The envelope assembly of claim 1 wherein the removable shape is defined on a first surface of the protective panel.
10. The envelope assembly of claim 9 further comprising at least one second fold line extending across the first surface of the protective panel within the perimeter of the removable shape.

11. The envelope assembly of claim 1, further comprising at least one tearable line within the sheet of material and the protective panel, the tearable line having a plurality of sections, each of the sections having a micro-perforated line connected to a die-cut line.

12. A label comprising:

a face sheet;

a shape on a first surface of the face sheet;

at least one removable panel within the shape;

an adhesive coating at least partially covering a second surface of the face sheet;

a protective panel, comprising at least one of a transparent material and a translucent material, to which the adhesive coating adheres significantly less than to the face sheet; and at least one fold line extending across a first surface of the shape.

13. The label of claim 12 wherein the shape defines a primary panel, a secondary panel, and at least two flaps, and each of the flaps is located adjacent the primary panel on one of a plurality of edges of the primary panel.

14. The label of claim 13 wherein the at least one fold line separates the primary panel from the secondary panel.

15. The label of claim 13 wherein the at least one fold line separates one of the flaps from the primary panel.

16. The label of claim 12 wherein the at least one fold line is marked with score lines.

17. The label of claim 12 wherein the at least one fold line is marked with perforations.

18. The label of claim 12 wherein the at least one fold line is marked with micro-perforations.

19. The label of claim 12 wherein the face sheet comprises a printable surface.

20. The label of claim 12, further comprising at least one tearable line within the face sheet and the protective panel, the tearable line having a plurality of sections, each of the sections having a micro-perforated line connected to a die-cut line.

21. A label comprising:

a face sheet;

an adhesive coating at least partially covering a first surface of the face sheet;

a protective panel, comprising at least one of a transparent material and a translucent material, to which the adhesive coating adheres significantly less than to the face sheet;

a shape defined on a second surface of the face sheet and on a first surface of the protective panel;

at least one removable panel within the shape; and at least one fold line extending across the first surface of the protective panel within a perimeter of the shape.

22. The label of claim 21 wherein the shape defines a primary panel, a secondary panel, and at least two flaps adjacent the primary panel on one of a plurality of edges of the primary panel.

23. The label of claim 22 wherein the at least one fold line separates the primary panel from the secondary panel.

24. The label of claim 22 wherein the at least one fold line separates one of the flaps from the primary panel.

25. The label of claim 21, further comprising at least one tearable line within the face sheet and the protective panel, the tearable line having a plurality of sections, each of the sections having a micro-perforated line connected to a die-cut line.

* * * * *